Figure 1:
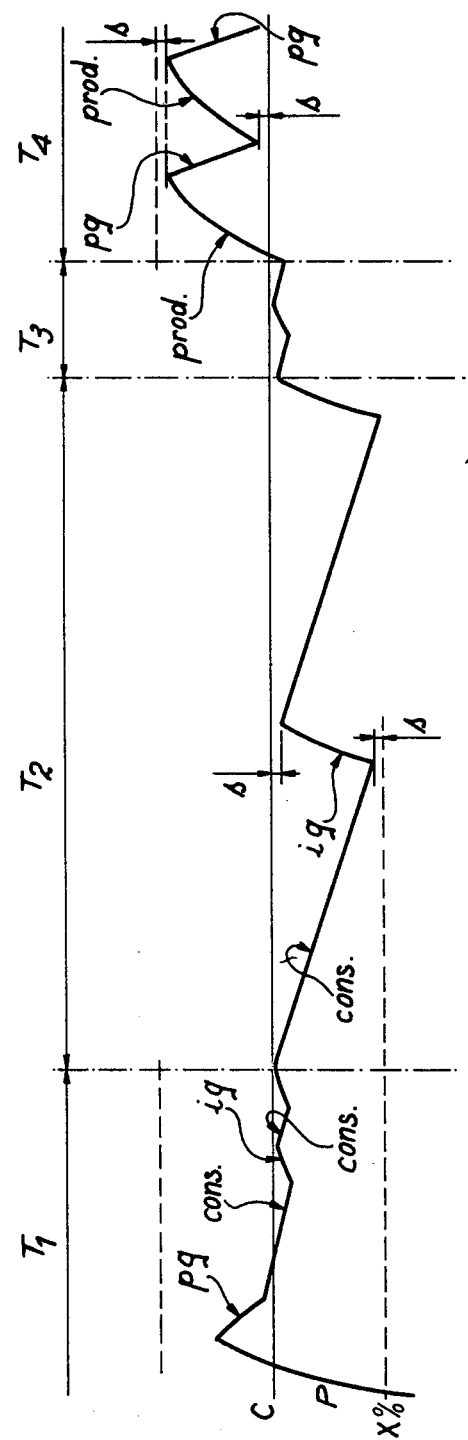

United States Patent [19]
Andre et al.

[11] 3,881,093
[45] Apr. 29, 1975

[54] METHOD OF REGULATION BY SAMPLING PARTIAL PRESSURE OF A GAS MIXTURE CONTAINED IN AT LEAST ONE ENCLOSURE AND A DEVICE FOR THE APPLICATION OF SAID METHOD

[75] Inventors: Marcel Andre, Manosque; Bernard Legrand, Aix-en-Provence; Jean-Marie Montigaud, Perthuis, all of France

[73] Assignee: Commissariat a l'Energie Atomique, Paris, France

[22] Filed: July 3, 1972

[21] Appl. No.: 268,891

[30] Foreign Application Priority Data
July 5, 1971  France .............................. 71.24407

[52] U.S. Cl. ............ 235/150.1; 23/232 E; 23/230 B
[51] Int. Cl. ......................... G01n 7/00; G01n 33/16
[58] Field of Search .................... 235/150.1, 151.35; 23/230 B, 232 E, 256; 250/41.9 G; 129/2.07

[56] References Cited
UNITED STATES PATENTS
3,005,911  10/1961  Barhans ..................... 235/151.35 X
3,045,665  7/1962  Moyat ................................ 128/2.07
3,391,275  7/1968  Bullock et al .................... 235/151.1
3,531,257  9/1970  Harvey et al. ..................... 23/256 X Primary Examiner—Eugene G. Botz
Attorney, Agent, or Firm—Cameron, Kerkam, Sutton, Stowell & Stowell

[57]  ABSTRACT

The method consists in sampling the partial pressure of a gas mixture within one or a number of enclosures containing at least one element which is capable of modifying said partial pressures.

Each partial pressure is regulated separately either in the "set-value" condition in which the pressure is maintained at a reference value or in the "variable-value" condition in which the pressure can vary freely under the effect of modifications imposed by the element contained in the enclosure, up to a predetermined limit beyond which the pressure is restored to a reference value.

A device for carrying out the method comprises a mass spectrometer for analyzing the composition of the gas mixtures, a data-recording circuit, injection valves and gas traps controlled by a set-value regulation circuit and by a variable-value regulation circuit, the mass spectrometer being intended to measure the partial pressure resulting from the action of said regulation circuits in a closed-loop system.

5 Claims, 4 Drawing Figures

METHOD OF REGULATION BY SAMPLING PARTIAL PRESSURE OF A GAS MIXTURE CONTAINED IN AT LEAST ONE ENCLOSURE AND A DEVICE FOR THE APPLICATION OF SAID METHOD

This invention relates to a method of regulation by sampling the partial pressures of a gas mixture within one or a number of enclosures containing at least one element which is liable to modify said partial pressures, as well as a device for carrying out said method.

The invention finds an application in agronomy and in the veterinary field, in particular in studies relating to the development of plants or animals as a function of the atmosphere in which they live.

Equipment units for making this type of study are already known to exist. In actual fact, units of this type control only climatic parameters (temperature, moisture, degree of illumination) and in some cases a single partial pressure of one of the gases contained within the enclosure.

Units of this type are subject a number of disadvantages:

they do not permit regulation of a number of partial pressures within an enclosure and *a fortiori* within a plurality of enclosures ;

they do not comprise any automatic system for permitting movement of the subject under study in order to deduce the behavior of this latter in a free atmosphere ;

they are not fitted with devices for recording production or consumption of gas by the organism placed within the enclosure and any defects which are liable to result in destruction of the experiment.

The invention overcomes all the imperfections mentioned in the foregoing by making possible to regulate about a reference value a plurality of partial pressures within each enclosure and in a large number of different enclosures (twenty enclosures, for example), to permit a variation in one or a number of partial pressures as required by the organism, to observe other physical parameters which are characteristic of the enclosures, to record information relating to the behavior of the organism and to provide warning of any defects or failures.

The invention is specifically concerned with a method of regulation by sampling the partial pressures of a gas mixture within one or a number of enclosures containing at least one element which is capable of modifying said partial pressures, the regulation being performed on said partial pressures independently of each other, wherein each partial pressure is regulated in accordance with either of two types of control referred-to as "set-value regulation" and "variable-value regulation," the set-value regualtion being characterized in that the pressure is maintained in the vicinity of a reference value, the variable-value regulation being characterized in that the pressure is permitted to vary freely under the effect of modifications imposed by the element contained in the enclosure, up to a predetermined limit beyond which said pressure is restored to a reference value.

The invention is further concerned with a device which makes use of said method and essentially comprises a mass spectrometer which is capable of analyzing the composition of the gas mixtures, a first electronic circuit for recording data and, for each of said partial pressures, a second electronic circuit for set-value regulation which is associated with said mass spectrometer, injection valves and gas traps controlled by said circuit and a third electronic circuit for variable-value regulation which controls said injection valves and said gas traps, said mass spectrometer being intended to measure the partial pressures resulting from the action of said second and third electronic circuits in a closed-loop system.

Figure 2:
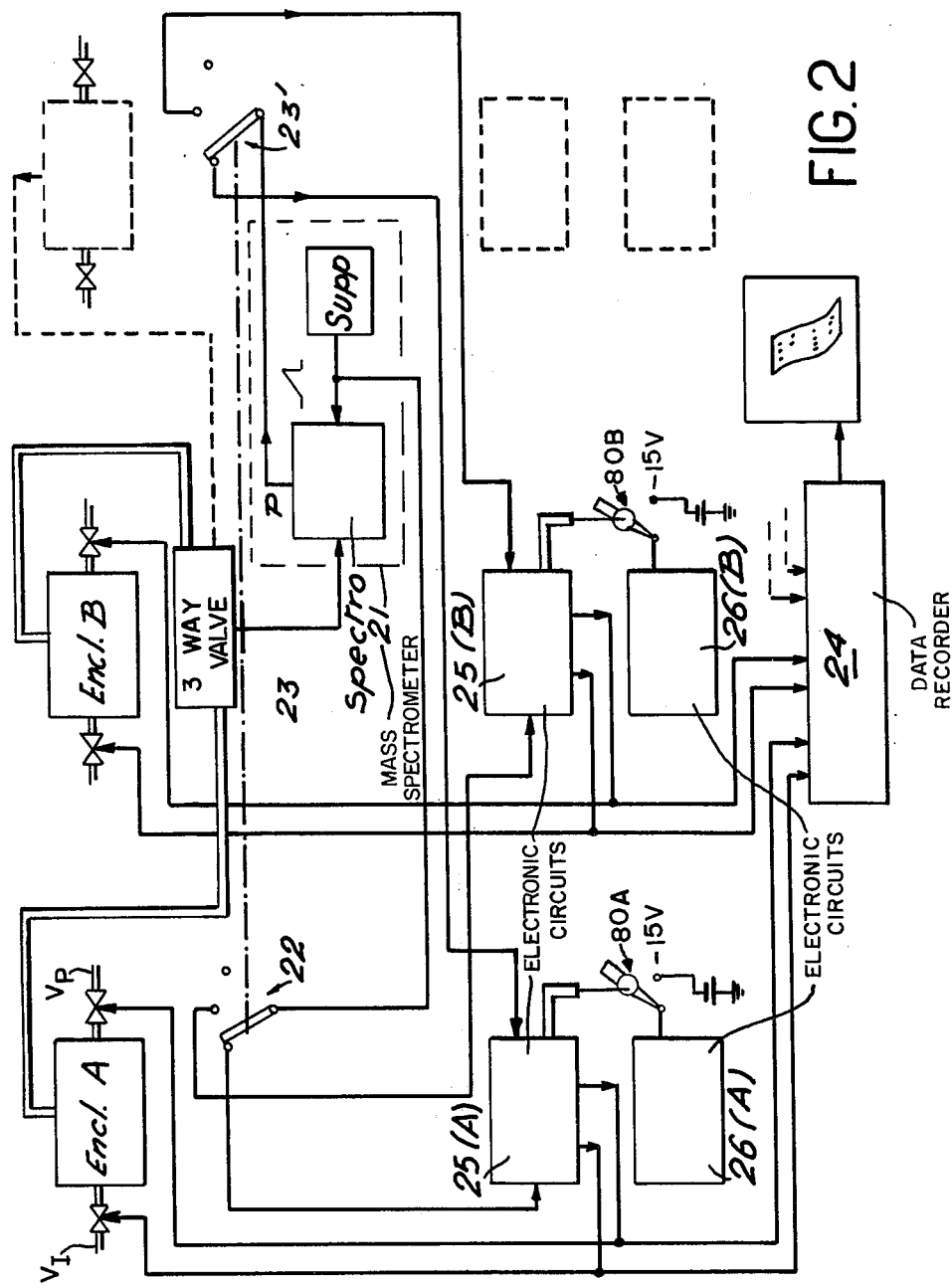
Figure 3:
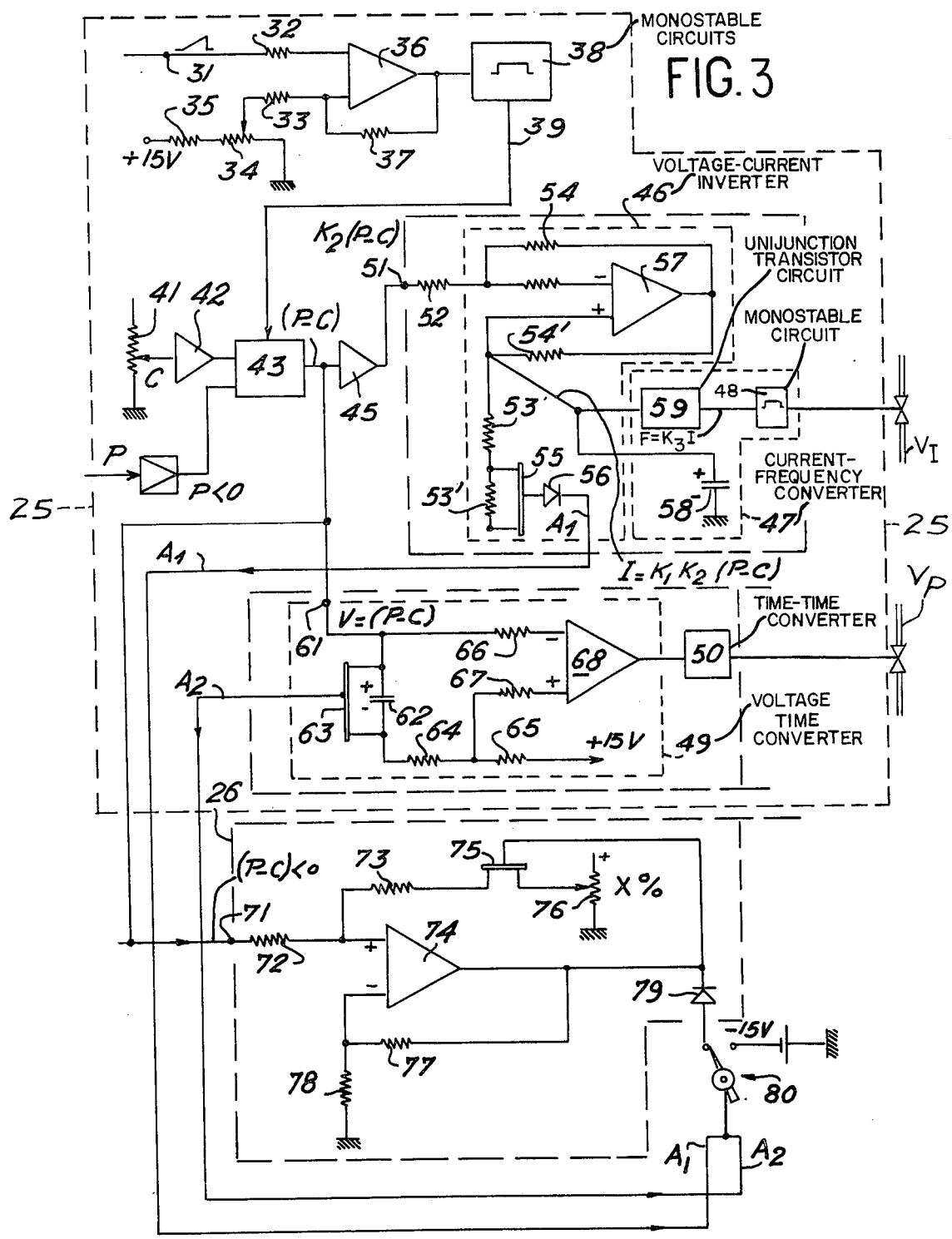
Figure 4:
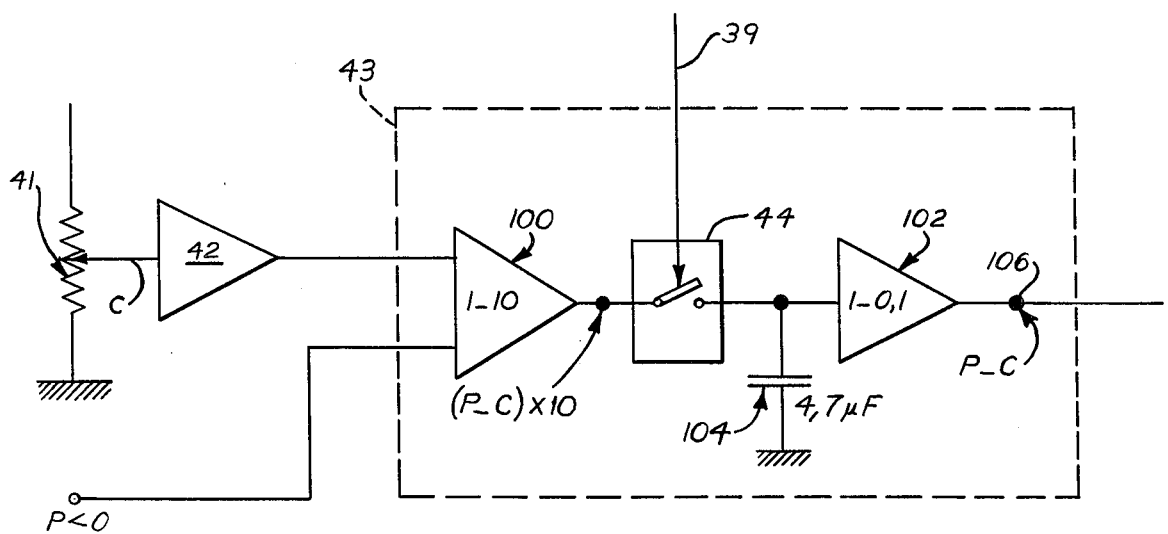

Further properties and advantages of the invention will become apparent from the following description of one exemplified embodiment which is given by way of indication and without any limitation, reference being made to the accompanying drawings, in which :

FIG. 1 is a schematic diagram of the method ;
FIG. 2 is a block diagram of the device ;
FIG. 3 is a diagram of the circuit of said device ; and
FIG. 4 is a schematic diagram of a voltage storage system forming a part of the circuitry of FIG. 3;

In FIG. 1, C is a reference value, P is the instantaneous value of a pressure, $T_1$ and $T_3$ are periods of set-value regulation, $T_2$ and $T_4$ are periods of variable-value regulation ; the principle of the method is as follows:

In set-value regulation (stages $T_1$ and $T_3$), the partial pressure P which is continuously maintained in the vicinity of the reference value C by means of an injection of gas (i.g.) if the element consumes this latter (cons.) or by trapping (pg.) if the element produces gas (prod.). In variable-value regulation (stages $T_2$ and $T_4$), the partial pressure P varies freely as required by the organism which consumes said gas, up to a limit of X percent of C (with deduction of a fixed minimum threshold value s) beyond which an injection of gas restores the partial pressure P to the reference value C with deduction of the fixed minimum threshold. The variable-value regulation is then continued. A return to the set-value regulation (stage $T_3$) restores the value of P to the vicinity of C. A period of variable-value regulation $T_4$ with production of gas by the element is also indicated with the top limit X percent of C with deduction of the fixed minimum threshold value from which P is restored to C plus the fixed minimum threshold value.

In FIG. 2, the circuitry for each enclosure is identified by reference numeral and suffix of the letter indicating the enclosure. The reference numeral 21 designates a mass spectrometer which is capable of analyzing the composition of gas mixtures within the enclosures A, B and so forth whilst the reference numerals 22 and 23' are synchronous switches with valve 23. The reference 24 designates a first electronic circuit for recording data, the reference 25 designates a first group of electronic circuits for set-value regulation, the reference 26 designates a second group of electronic circuits for variable-value regulation. The reference VI designates one of the gas-injection valves and VP designates one of the gas-trapping valves of the enclosure A, said valves being controlled by the circuit 25. The reference 27 designates a switch.

The operation of the device according to the invention is as follows:

The valve 23 connects the mass spectrometer 21 successively to the enclosures A, B and so forth. The spectrometer scans successively the partial pressures P of the gases contained in each enclosure (e.g., four partial pressures and twenty enclosures). The spectrometer delivers two signals and is controlled by a saw tooth voltage which is applied to the deflection members which causes a continuous scavaging of the selected masses. This voltage is furnished by a known source. The saw tooth voltage which is routed by switch 22 corresponds to this scavaging signal. The value of the pressure measured by the spectrometer is routed by the second connection and is directed by switch 23'. One of the signals is a linear saw-tooth voltage which is directed by the switch 22 to the electronic circuit 25. The other signal reflects the values of the partial pressures of the enclosure A which are directed by the switch 23' to the same circuit 25. The circuit 25 comprises a number of regulating circuits corresponding to the number of partial pressures to be regulated (four, for example) ; the switch 27 defines the type of regulation adopted, whether of the set-value type (utilization of the circuit 25) or of the variable-value type (utilization of the circuit 26). The circuit 26 for variable-value regulation in turn comprises a number of circuits corresponding to the number of partial pressures to be regulated within each enclosure. In set-value regulation, one of the circuits 25 which is assigned to one predetermined gas effects a comparison between the value of P and the reference value C and opens the normally closed injection valve VI of the gas considered if P-C < 0 and the trapping valve VP if P-C > 0. In variable-value regulation, the circuit 26 cancels the above-mentioned injection and trapping functions. The circuit 26 then compares the value of the partial pressure P with the ultimate value X percent of C with deduction of a fixed minimum threshold value. When P attains this value, the injection or trapping functions are restored.

When scanning of an enclosure has been performed by the spectrometer, this latter analyzes the contents of another enclosure as defined by the valve 23 and the signals delivered by the spectrometer are directed by the switches 22 and 23' towards the groups of circuits associated with the new enclosure which is being scanned. When all the enclosures have been scanned, the spectrometer is again connected to the enclosure A by means of the valve 23 and measures the new partial pressures obtained, thus closing the regulating loop. The circuit 24 keeps account of the injection frequencies and the trapping times for the recording of these data.

The electronic circuit 25 of FIG. 2 performs two functions. The first is a sequential function for successively initiating the operation of each of the circuits which have the role of set-value regulation of one of the gases of the enclosure considered. The second is the regulating function proper.

FIG. 3 shows the circuit of the device.

In this figure, the reference 31 designates a connection, the references 32 and 33 designate resistors having a value of 470 kilohms, the reference 34 designates a resistor having a value of 470 ohms, 35 designates a resistor having a value of 150 ohms, 36 designates an operational amplifier, 37 designates a resistor having a value of 47 megohms, 38 designates a monostable circuit having a time-duration of 170 msecs, 39 and 40 designate connections.

The operation of this device is as follows :

The linear saw-tooth voltage derived from the spectrometer is applied to the connection 31. This voltage is proportional at each instant to the molecular mass of the gas, the pressure of which is analyzed at this instant by the spectrometer. The resistance bridge 33, 34 and 35 defines a voltage at the positive input of the operational amplifier 36, this voltage being characteristic of the molecular mass of the gas to be pressure-regulated. When the saw-tooth voltage has not attained the voltage which identifies the gas, the voltage at the output of the amplifier 36 is + 15 V. When the saw-tooth voltage coincides with the voltage which is characteristic of the gas considered, the operational amplifier changes state and a voltage of − 15 V appears at the output of 36. This change of state triggers the monostable circuit 38 having a time-duration of 170 msecs which transmits this square-wave signal via the connection 39 to a relay, the function of which will become apparent from the following description.

Reference 41 designates a display potentiometer, the reference 42 designates an operational amplifier having a gain of 1 (unity), the reference 43 designates a voltage-storage system, 44 designates a relay, 45 designates an operational amplifier having a gain $K_2$ within the range of 1 to 20, the reference 46 designates a voltage-current converter circuit, 47 designates a current-frequency converter, 48 designates a monostable circuit having a time-duration of 300 msecs, VI designates an injection valve, 49 represents a voltage-time converter, 50 represents a time-time converter, VP is a trapping valve.

The operation of this device is as follows : the reference value C is applied by means of the potentiometer 41 having an impedance which is matched by the amplifier 42. This reference value is compared in the voltage storage system 43 with the maximum value P of the peak supplied by the spectrometer and its associated circuits (amplification of the peak and detection of the maximum value ; circuits which are not shown in the drawings always supply a negativ voltage P).

When the peak derived from the spectrometer corresponds to the gas to be pressure-regulated, the relay 44 associated with the circuit 43 is closed for a period of 170 msecs by virtue of the signal delivered by the monostable circuit 38 of FIG. 3, the operation of which has been described. The scanning peaks of the spectrometer are applied to all the regulating circuits related to the enclosure A (four in the example herein described) but the circuit in which the relay is closed alone provides effective regulation of a partial pressure.

The circuit 43 forms an error voltage P-C. This circuit contains the relay 44 and makes it possible to store the voltage P-C when said relay is closed. The storage system is well known and may be a storage condenser between two amplifiers. In the case of the regulating circuit which has been put into operation by virtue of the sequential function, the stored voltage P-C is therefore found at the output of the circuit 43.

The gain $K_2$ of the operational amplifier 45 adjusts the gain of the injection valve VI. A voltage $V = K_2$ (P-C) is present at the output of said amplifier 45. The converter 46 transforms this voltage into a current I = $K_1V$. The circuit 47 converts the current into a series of pulses having a repetition frequency which is proportional to the current I. By means of the monostable circuit 48, said pulses initiate opening of the injection valve VI at the frequency $f = K_3 I = K_1K_2K_3$ (P-C). The circuit 46-47 within the upper rectangle is described in detail below with reference to FIG. 5. This circuit can operate only if P-C < 0. If P-C > 0, the circuit 49 converts the voltage V = P-C into a time interval $\tau$ which is inversely proportional to $V$ : $\tau = K_4/V$. A logic circuit 50 converts $\tau$ into $t = T - \tau$ wherein T represents the period of scanning the entire system. This time interval defines the opening time of the trapping valve VP. The circuit 49 operates only if (P-C) > 0. This circuit is described in detail below.

The injection circuit 46-47 is now described in detail.

Reference numeral 51 represents a connection, 52 represents a resistor having a value of 15 kilohms, 53 and 53' represent two resistors having a value of 7.5 kilohms, 54 and 54' represent two resistors having a value of 5.6 kilohms, 55 designates a field-effect transistor, 56 designates a diode, 57 designates an operational amplifier, 58 is a capacitor having a capacitance of 100 microfarads, 59 is a circuit which mainly comprises a unijunction transistor, and $A_1$ is a connection.

The operation of this device is as follows : in set-value regulation, the connection $A_1$ is biased at − 15 V. The field-effect transistor 55 is open. The positive input terminal of the operational amplifier 57 is therefore connected to 7.5 kilohms + 7.5 kilohms = 15 kilohms. The resistors 52 and 53 + 53' are therefore of equal value and the same applies to the resistors 54 and 54'. Under these conditions, the amplifier 57 converts the voltage $V = K_2$ (P-C) which appears in the connection 51 into a constant current I which charges the capacitor 58. The terminal voltage of the capacitor 58 therefore increases linearly with time and attains the threshold of the unijunction transistor ; the capacitor 58 is then discharged and a pulse appears at the output of the circuit 59. The process begins again, thus defining a pulse appearance frequency which is proportional to the current I, said current being in turn proportional to V. This system operates only on condition that P-C < 0 since, if P-C > 0, the capacitor 58 is charged in the other direction and never attains the positive value of the threshold of the unijunction transistor.

If the connection $A_1$ were brought to + 15 V, the field-effect transistor would be equivalent to a short-circuit and the resistance 53' would be nullified. The resistances 52 and 53 + 53' would be unequal, thus upsetting the equilibrium of the system and preventing the voltage-to-current conversion. The gas-injection function would therefore be suppressed.

The trapping circuit 49 will now be described in detail.

Reference 61 designates a connection, 62 designates a capacitor having a capacitance of 250 microfarads, 63 designates a field-effect transistor, 64 designates a resistor having a value of 650 ohms, 65 designates a resistor having a value of 27 kilohms, 66 and 67 designate resistors having a value of 4.7 kilohms, 68 designates an operational amplifier, $A_2$ designates a connection.

The operation of this device is as follows : in set-value regulation, the connection $A_2$ is biased at − 15 V. The field-effect transistor 63 is open. The voltage (P-C) > 0 which is supplied to the connection 61 charges the capacitor 62. This charge takes place exponentially. A positive signal is present at the output of the operational amplifier 68 as long as the terminal voltage of the capacitor 62 has not attained a predetermined threshold value. The time taken to cause the operational amplifier 68 to change state therefore corresponds to the time-duration of the square-wave signal which is obtained after the amplifier 68. This time interval is inversely proportional to the charging voltage (P-C).

Since the trapping time must be an increasing function of P-C, this circuit is completed by a logic circuit which converts $\tau$ into T - $\tau$ if T is the period of scanning of the complete system as has been already stated (in the case of twenty enclosures and four pressures to be regulated per enclosure T = 360 seconds). The trapping valve is therefore actuated only when the time-duration of the monostable circuit has elapsed.

If (P-C) < 0, the capacitor is charged in the opposite direction and the voltage never reaches the threshold value which causes a reversal of state of the monostable circuit. This circuit therefore operates only when (P-C) > 0. If the connection $A_2$ were biased at + 15 V, the field-effect transistor 63 would be equivalent to a short-circuit which eliminates the capacitor 62 and at the same time dispenses with the voltage-time conversion. The function would accordingly be cancelled.

The variable-value regulation, the circuit of which was represented diagrammatically by the circuit 26 in FIG. 2 will now be described in detail, 71 designates a connection, 72 and 73 designate resistors having a value of 100 kilohms, 74 designates an operational amplifier, 75 designates a field-effect transistor, 76 designates a display potentiometer, 77 designates a resistor having a value of 1 megohm, 78 designates a resistor having a value of 2.2 kilohms, 79 is a diode, 80 is a switching key, $A_1$ and $A_2$ are connections.

The operation of this device is as follows : in variable-value regulation, the key 80 joins the connections $A_1$ and $A_2$ together at the output of the operational amplifier 74.

The voltage P-C terminates at the connection 71 : this voltage is always made negative by means of a circuit which is not illustrated. The threshold value X percent of C is indicated by the potentiometer 76. The high value of the resistor 77 in comparison with the value of the resistor 78 defines at the negative input of the amplifier 74 a very low voltage $\epsilon$ of the order of 30 mV. The voltage X percent - (P-C) appears at the positive input of the amplifier 74 if the field-effect transistor 75 is in short-circuit and (P-C) appears if said transistor 75 is open.

The sequence of possible states is accordingly as follows : it will first be assumed that P-C = 0. X percent is found at the positive input of the amplifier 74 and $\epsilon$ is found at the negative input of said amplifier. There is found at the output of the amplifier 74 + 15 V and $\epsilon$ is positive. The field-effect transistor 75 is therefore in short-circuit. The voltage + 15 V is transmitted by the key 80 to the connections $A_1$ and $A_2$. These connections correspond to the injection and trapping functions. The voltage + 15 V is therefore applied to the gates of the field-effect transistors 55 and 63. These field-effect transistors accordingly behave as short-circuits and, as has been explained earlier, the injection and trapping functions are cancelled.

The partial pressure therefore varies progressively as required by the organism contained within the enclosure and (P-C) increases at absolute value. As long as | P-C| < X percent, the situation is as described in the previous paragraph.

When [ X percent - | P-C | ]becomes smaller than $\epsilon$, the operational amplifier changes state and supplies − 15 V at the output. This negative voltage is applied to the gate of the field-effect transistor 75 which opens. The voltage (P-C) appears at the positive terminal of the operational amplifier 74 and the voltage $\epsilon$ which is now < 0 appears at the negative terminal of said amplifier. Moreover, the voltage − 15 V is applied to the connections A₁ and A₂, thereby opening the two field-effect transistors 55 and 63 of the injection and trapping circuits. Either of these two functions is restored according to the sign of P-C. It will be assumed that P-C < 0 ; the injection of gas causes P to increase until P-C becomes equal to $\epsilon$ ($\epsilon$ < 0). In this case, the operational amplifier changes state, the voltage at the output of the amplifier 74 becomes equal to − 15 V, the three field-effect transistors are in short-circuit and the injection and trapping functions are again stopped. The threshold value X percent reappears at the positive terminal and $\epsilon$ again becomes positive. The process then continues as described in the foregoing.

The presence of the fixed minimum threshold value $\epsilon$is intended to prevent the system from being triggered by extraneous signals.

Should it be desired to revert to set value regulation, the key 80 is caused to change state to the bias − 15 V. The field-effect transistors 55 and 63 are open and the injection and trapping functions are performed in accordance with the principle of set-value regulation.

The degree of accuracy obtained in set-value regulation depends on the number of enclosures in which regulation of pressures is to be performed. For example, in the case of twenty enclosures and four regulated partial pressures per enclosure, the pressure P varies progressively by ± 5 percent with respect to the reference value C.

Under conditions of variable-value regulation, the pressure P can differ from the reference value C to an appreciable extent ; the auxiliary defect-indicating function, which has not been discussed in this description, is suppressed.

It is readily apparent that this description has been given solely by way of explanation without any implied limitation and that any detail modifications can be made therein without departing from the scope of the invention. In particular, said first electronic circuit 24 (FIG. 2) can be associated with a punched-tape device which makes it possible to follow the variation of partial pressures or of values of other parameters such as temperature, for example. Furthermore, each enclosure can comprise a device for indicating defects or breakdown of all the elements, the failure of which could have an adverse effect on the experiment.

What we claim is:

1. A method of regulation by sampling the partial pressures of a gas mixture within at least one enclosure containing at least one element modifying said partial pressures, the regulation being performed on said partial pressures independently of each other, wherein each partial pressure is regulated in accordance with either of two types of control, a set-value regulation and variable-value regulation, the set-value regulation having the pressure maintained in the vicinity of a reference value, the variable-value regulation having the pressure varying freely under the effect of modifications caused by the element in the enclosure, up to a predetermined limit beyond which said pressure is restored to a reference value.

2. A device for regulation by sampling the partial pressures of a gas mixture within at least one enclosure containing at least one element capable of modifying said partial pressures comprising a mass spectrometer for analyzing the composition of the gas mixtures, a first electronic circuit for recording data and, for each of said partial pressures, a second electronic circuit for set-value regulation associated with said mass spectrometer, injection valves and gas traps controlled by said circuit and a third electronic circuit for variable-value regulation controlling said injection valves and said gas traps, said mass spectrometer measuring the partial pressures resulting from the action of said second and third electronic circuits in a closed-loop system.

3. A device according to claim 2, wherein each of said second electronic circuits for set-value regulation comprises a potentiometer displaying the reference pressure, an impedance-matching operational amplifier, a circuit comparing the pressure indicated by the spectrometer and the reference pressure, a storage circuit whose output controls according to the sign of the stored quantity either a gas injection circuit comprising a variable-gain operational amplifier, a voltage-current converter, a current-frequency converter and a monostable circuit actuating the injection valve or a trapping circuit comprising a voltage-time converter actuating the trapping valve.

4. A device according to claim 2, wherein each of said third electronic circuits for variable-value regulation comprises an operational amplifier having two inputs and one output, a resistance bridge connected between the negative input and the output of said amplifier, a field-effect transistor connected between the positive input and a threshold display potentiometer and the gate of which is connected to the output of said amplifier and connections coupling the output of said amplifier with the injection and trapping valves through said second circuits, a signal being applied to said positive input corresponding to the difference between said reference value and the pressure indicated by said spectrometer.

5. A device according to claim 2, wherein said first electronic circuit is connected to each of said second electronic circuits for set-value regulation and wherein said device
includes an accounting circuit which receives and records the controlling inputs from the injection and trapping circuits and
a circuit which controls a perforator in which said recorded controlling inputs are punched.

* * * * *